(12) United States Patent
Satou et al.

(10) Patent No.: US 10,359,091 B2
(45) Date of Patent: Jul. 23, 2019

(54) VIBRATION DAMPING DEVICE

(71) Applicant: BRIDGESTONE CORPORATION, Tokyo (JP)

(72) Inventors: Shunji Satou, Tokyo (JP); Takashi Kawashima, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/515,694

(22) PCT Filed: Sep. 2, 2015

(86) PCT No.: PCT/JP2015/074929
§ 371 (c)(1),
(2) Date: Mar. 30, 2017

(87) PCT Pub. No.: WO2016/052062
PCT Pub. Date: Apr. 7, 2016

(65) Prior Publication Data
US 2017/0299008 A1 Oct. 19, 2017

(30) Foreign Application Priority Data

Oct. 3, 2014 (JP) ................................. 2014-205042
Mar. 13, 2015 (JP) ................................. 2015-050987

(51) Int. Cl.
*F16F 1/38* (2006.01)
*B60K 5/12* (2006.01)
(Continued)

(52) U.S. Cl.
CPC ................ *F16F 1/38* (2013.01); *B60G 11/22* (2013.01); *B60K 5/12* (2013.01); *B60K 5/1208* (2013.01);
(Continued)

(58) Field of Classification Search
CPC .... F16F 1/38; F16F 13/14; F16F 13/18; F16F 2234/02; B60K 5/1208; B60G 11/22; B60G 15/06
See application file for complete search history.

(56) References Cited

U.S. PATENT DOCUMENTS 4,630,806 A * 12/1986 Dan ..................... F16F 13/14
16/2.1
4,702,346 A * 10/1987 Uno ..................... F16F 13/14
181/207
(Continued)

FOREIGN PATENT DOCUMENTS

CN 101265955 A 9/2008
CN 102785545 A 11/2012
(Continued)

OTHER PUBLICATIONS

International Search Report for PCT/JP2015/074929, dated Oct. 13, 2015.
(Continued)

*Primary Examiner* — Xuan Lan Nguyen
(74) *Attorney, Agent, or Firm* — Sughrue Mion, PLLC

(57) ABSTRACT

The present invention relates to a vibration damping device including an outer attachment member (10) connected to one of a vibration generating part and a vibration receiving part, an inner attachment member (20) connected to the other, and an elastic body (30) configured to connect the outer attachment member (10) and the inner attachment member (20), wherein the outer attachment member (10) is formed in a cylindrical shape, the inner attachment member (20) includes a plate-shaped rigid member (21) disposed in the outer attachment member (10) and an interior member (28) located in the outer attachment member (10), fixed to the rigid member (21), and formed of a synthetic resin material, and, at protruding portions (22, 23) of the rigid member (21)
(Continued)

which protrude outward from the outer attachment member (10) in an axial direction along a central axis (O) of the outer attachment member (10), mounting holes (22a, 23a) which are open in a diameter direction orthogonal to the axial direction and have a fastening member configured to connect the protruding portions (22, 23) and the other of the vibration generating part and the vibration receiving part fitted thereinto are formed.

7 Claims, 7 Drawing Sheets

(51) Int. Cl.
| | | |
|---|---|---|
| *F16F 13/14* | (2006.01) | |
| *F16F 13/16* | (2006.01) | |
| *F16F 15/08* | (2006.01) | |
| *F16F 1/387* | (2006.01) | |
| *B60G 11/22* | (2006.01) | |
| B60G 15/06 | (2006.01) | |
| F16F 13/18 | (2006.01) | |

(52) U.S. Cl.
CPC .............. *F16F 1/387* (2013.01); *F16F 13/14* (2013.01); *F16F 13/16* (2013.01); *F16F 15/08* (2013.01); B60G 15/06 (2013.01); F16F 13/18 (2013.01); F16F 2224/025 (2013.01); F16F 2230/0005 (2013.01); F16F 2234/02 (2013.01)

(56) References Cited

U.S. PATENT DOCUMENTS

| | | | | |
|---|---|---|---|---|
| 4,871,152 A | * | 10/1989 | Funahashi | F16F 13/14 |
| | | | | 267/140.12 |
| 4,883,260 A | * | 11/1989 | Kanda | F16F 13/14 |
| | | | | 267/140.12 |
| 5,190,269 A | * | 3/1993 | Ikeda | F16F 1/387 |
| | | | | 267/140.12 |
| 5,439,203 A | | 8/1995 | Hadano | |
| 6,364,298 B1 | * | 4/2002 | Vossel | F16F 13/14 |
| | | | | 267/140.12 |
| 2001/0024006 A1 | * | 9/2001 | Murai | F16F 13/14 |
| | | | | 267/141 |
| 2003/0234477 A1 | * | 12/2003 | Beer | F16F 9/003 |
| | | | | 267/140.12 |
| 2008/0224368 A1 | | 9/2008 | Kato | |
| 2012/0292872 A1 | | 11/2012 | Koide et al. | |
| 2013/0038006 A1 | | 2/2013 | Saito et al. | |

FOREIGN PATENT DOCUMENTS

| | | |
|---|---|---|
| JP | 63-111336 A | 5/1988 |
| JP | 07-280014 A | 10/1995 |
| JP | 9-133175 A | 5/1997 |
| JP | 2005-155822 A | 6/2005 |
| JP | 2005-282780 A | 10/2005 |
| JP | 2006-250340 A | 9/2006 |
| JP | 2008-133841 A | 6/2008 |
| JP | 2010-101385 A | 5/2010 |
| JP | 2012-187964 A | 10/2012 |
| JP | 5457261 B2 | 4/2014 |

OTHER PUBLICATIONS

Communication dated Oct. 27, 2017 issued by the European Patent Office in counterpart European application No. 15847587.1.
Search Report dated Aug. 27, 2018, in corresponding Chinese Application No. 201580053337.1.

* cited by examiner

VIBRATION DAMPING DEVICE

TECHNICAL FIELD

The present invention relates to a vibration damping device that is applied to, for example, automobiles, industrial machines, and the like, for absorbing and attenuating vibrations of a vibration generating part of an engine or the like.

Priority is claimed on Japanese Patent Application No. 2014-205042, filed Oct. 3, 2014, and Japanese Patent Application No. 2015-50987, filed Mar. 13, 2015, the content of which is incorporated herein by reference.

BACKGROUND ART

Conventionally, a vibration damping device including an outer attachment member connected to one of a vibration generating part and a vibration receiving part, an inner attachment member connected to the other, and an elastic body configured to connect the outer attachment member and the inner attachment member is known.

For this type of vibration damping device, for example, as shown in the following Patent Document 1, a constitution in which a fastening member is inserted into the inner attachment member in a diameter direction that is orthogonal to an axial direction of the outer attachment member and the inner attachment member is connected to the other of the vibration generating part and the vibration receiving part is known.

Also, conventionally, as a vibration damping device that is applied to, for example, automobiles, industrial machines, and the like for absorbing and attenuating vibrations of a vibration generating part of an engine, a driving device, or the like, a vibration damping device including an outer attachment member connected to either one of a vibration generating part and a vibration receiving part, an inner attachment member connected to the other, and an elastic body configured to connect the outer attachment member and the inner attachment member is known.

In this type of vibration damping device, it is known that vibrations are efficiently absorbed and attenuated by adjusting a spring ratio in three directions (an axial direction in the vibration damping device, two directions orthogonal to the axial direction) in the device with respect to vibrations that may be input. For example, in Patent Document 2, for a cylindrical bush including an inner cylinder, an outer cylinder configured to surround the inner cylinder, and an elastic member configured to connect the inner and outer cylinders, wherein an input direction of a main vibration is a direction that is orthogonal to an axis of the inner cylinder, a cylindrical bush having a protruding portion protruding in a radial direction from the inner cylinder to be substantially parallel to the input direction of the main vibration, an elastic body configured to connect the protruding portion and the outer cylinder, and an elastic body support part configured to support the elastic body between the protruding portion and the outer cylinder has been proposed, wherein, in the three orthogonal axis directions including the input direction of the main vibration as one axis, the elastic body support part does not regulate movement of the main vibration of the protruding portion in the input direction and regulates the remaining two axis directions.

CITATION LIST

Patent Document

[Patent Document 1]
Japanese Unexamined Patent Application, First Publication No. H07-280014
[Patent Document 2]
Japanese Unexamined Patent Application, First Publication No. 2005-155822

SUMMARY OF INVENTION

Technical Problem

However, in the vibration damping device of the background art, there is a problem in that a portion of the inner attachment member into which the fastening member is inserted is difficult to manufacture, due to being manufactured by crushing a cylindrical body or a rod body in a diameter direction and flattening the cylindrical body or the rod body, or fitting a separate member having a flat portion into a cylindrical body.

Also, in the above-described vibration damping device, although a spring ratio in a direction that is different from the input direction of the main vibration can be adjusted, a vibration damping device which can be manufactured by a simpler method is required.

The present invention has been made in view of the above circumstances, and an objective of the present invention is to provide a vibration damping device which can be easily manufactured at low cost.

Another objective of the present invention is to provide a vibration damping device which can be manufactured by a simple method in which a spring ratio in a direction different from an input direction of a main vibration is controlled.

Solution to Problem

According to the present invention, a vibration damping device includes an outer attachment member connected to one of a vibration generating part and a vibration receiving part, an inner attachment member connected to the other, and an elastic body configured to connect the outer attachment member and the inner attachment member, wherein the outer attachment member is formed in a cylindrical shape, the inner attachment member includes a plate-shaped rigid member disposed in the outer attachment member and an interior member located in the outer attachment member, fixed to the rigid member, and formed of a synthetic resin material, and, at a protruding portion of the rigid member that is protruding outward from the outer attachment member in an axial direction along a central axis of the outer attachment member, a mounting hole that is open in a diameter direction orthogonal to the axial direction and has a fastening member configured to connect the protruding portion and the other of the vibration generating part and the vibration receiving part fitted thereinto is formed.

Also, according to the present invention, a vibration damping device includes an outer attachment member connected to one of a vibration generating part and a vibration receiving part, an inner attachment member connected to the other, and an elastic body configured to connect the outer attachment member and the inner attachment member, wherein the outer attachment member is formed in a cylindrical shape, the inner attachment member includes a rigid member disposed in the outer attachment member and an interior member located in the outer attachment member in an axial direction along a central axis of the outer attachment member, fixed to the rigid member, and formed of a synthetic resin material, a first protruding portion protruding outward in a diameter direction orthogonal to the axial direction is formed in the interior member, a second protruding portion protruding inward in the diameter direction is formed in the outer attachment member, and the first protruding portion and the second protruding portion are disposed such that positions in the circumferential direction around the central axis of the outer attachment member correspond to each other and positions in the axial direction are different from each other.

Effects of Invention

According to the present invention, it is possible to provide a vibration damping device which can be easily manufactured at low cost.

Also, according to the present invention, it is possible to provide a vibration damping device which can be manufactured by a simple method in which a spring ratio in a direction different from an input direction of a main vibration is controlled.

DESCRIPTION OF EMBODIMENTS

Figure 1:
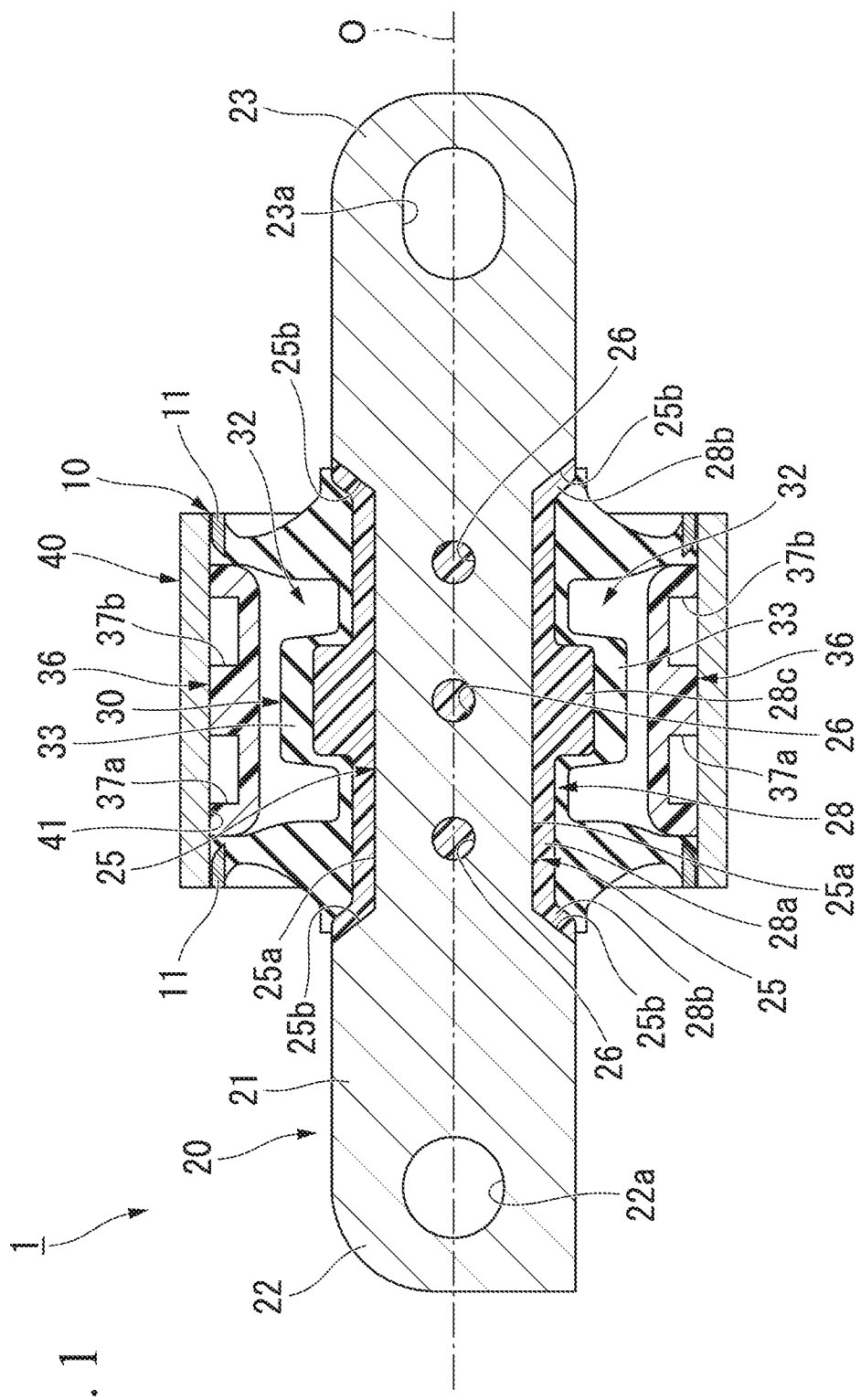
FIG. 1 is a longitudinal cross-sectional view showing a vibration damping device according to a first embodiment of the present invention.

Hereinafter, referring to the drawings, a vibration damping device according to a first embodiment of the present invention will be described with reference to FIGS. 1 and 2.

As shown in FIG. 1, a vibration damping device 1 of the present embodiment is disposed, for example, at a connecting portion between a trailing arm of a torsion beam type rear suspension (a vibration generating part) and a vehicle body (a vibration receiving part).

The vibration damping device 1 includes an outer attachment member 10 connected to either one of a cylindrical vibration generating part and a vibration receiving part, an inner attachment member 20 connected to the other, and an elastic body 30 configured to elastically connect the outer attachment member 10 and the inner attachment member 20, wherein the outer attachment member 10 is arranged inside an outer cylinder 40.

In the shown example, the outer cylinder 40, the outer attachment member 10, the inner attachment member 20, and the elastic body 30 are arranged to be coaxial with a common axis. Hereinafter, the common axis is referred to as a central axis O, a direction along the central axis O is referred to as an axial direction, a direction orthogonal to the central axis O in a plan view when viewed from the axial direction is referred to as a diameter direction, and a direction of rotation around the central axis O is referred to as a circumferential direction.

The outer cylinder 40 is formed in a cylindrical shape of, for example, a metal material. The outer attachment member 10 is press-fitted into an inner surface 41 of the outer cylinder 40.

The outer attachment member 10 is formed in a cylindrical shape extending along the axial direction of, for example, a metal material, and is fixed via the outer cylinder 40 to, for example, a trailing arm (not shown) which serves as a vibration generating part. The outer attachment member 10 includes a pair of ring parts 11 which are separately disposed at both end portions in the axial direction and extend over the entire circumference and a connecting part (not shown) configured to connect the pair of ring parts 11. The pair of ring parts 11 and the connecting part are integrally formed.

The inner attachment member 20 includes a plate-shaped rigid member 21 disposed in the outer attachment member 10 and an interior member 28 located in the outer attachment member 10, fixed to the rigid member 21, and formed of a synthetic resin material.

The rigid member 21 is formed in a rectangular shape having a predetermined width in the diameter direction and extending along the axial direction, of, for example, a metal material. The width of the rigid member 21 is narrower than an inner diameter of the outer attachment member 10. A length along the axial direction of the rigid member 21 is longer than a length along the axial direction of the outer attachment member 10.

Both end portions of the rigid member 21 are protruding portions 22 and 23 respectively protruding outward from both end portions of the outer attachment member 10 in the axial direction. The rigid member 21 is disposed in the outer attachment member 10 so that a protruding length of one protruding portion 22 is equal to a protruding length of the other protruding portion 23.

The one protruding portion 22 is chamfered at one corner portion, and the one corner portion has an arc shape in a plan view. The other protruding portion 23 is chamfered at both corner portions, and both corner portions each have an arc shape in a plan view.

Mounting holes 22a and 23a which open in the diameter direction and a thickness direction of the rigid member 21 are formed in the protruding portions 22 and 23, respectively. The mounting holes 22a and 23a pass through front and rear surfaces of the rigid member 21.

The mounting hole 22a of the one protruding portion 22 has a circular shape having a center on the central axis O in a plan view. The mounting hole 23a of the other protruding portion 23 has an elliptical shape having a long axis in a direction along the central axis O in a plan view and a short axis in a direction orthogonal to the central axis O.

A fastening member (not shown) such as a bolt is inserted into the mounting holes 22a and 23a. The inner attachment member 20 is connected to a vehicle body (not shown), which serves as a vibration receiving part, via the fastening member.

The rigid member 21 includes a pair of recessed portions 25 formed in a portion located in the outer attachment member 10 to narrow the width of the rigid member 21. The recessed portions 25 are formed by recessed portions of both sides surfaces of the rigid member 21 in the width direction that are located in the outer attachment member 10. The recessed portion 25 includes a bottom surface 25a along the axial direction and a pair of inclined surfaces 25b and 25b provided to intersect the axial direction. The pair of inclined surfaces 25b and 25b are inclined so that a separation distance therebetween gradually increases from an inside toward an outside in the diameter direction. In the rigid member 21, a plurality of concave portions 26 are formed in the outer attachment member 10 and between the pair of recessed portions 25 and 25. The concave portion 26 is formed in a circular shape having a center on the central axis O in a plan view. Three concave portions 26 are formed at equal intervals in the axial direction. The plurality of concave portions 26 are formed on a surface of the rigid member 21 and are through-holes passing through the front and rear surfaces of the rigid member 21.

The interior member 28 is a portion located in the outer attachment member 10 and is fixed to the rigid member 21 from inside the recessed portion 25. The interior member 28 is fixed to the rigid member 21 in a state in which a synthetic resin material is introduced into the concave portion 26 of the rigid member 21 by, for example, insert molding using the rigid member 21 as an insert item.

Figure 2:
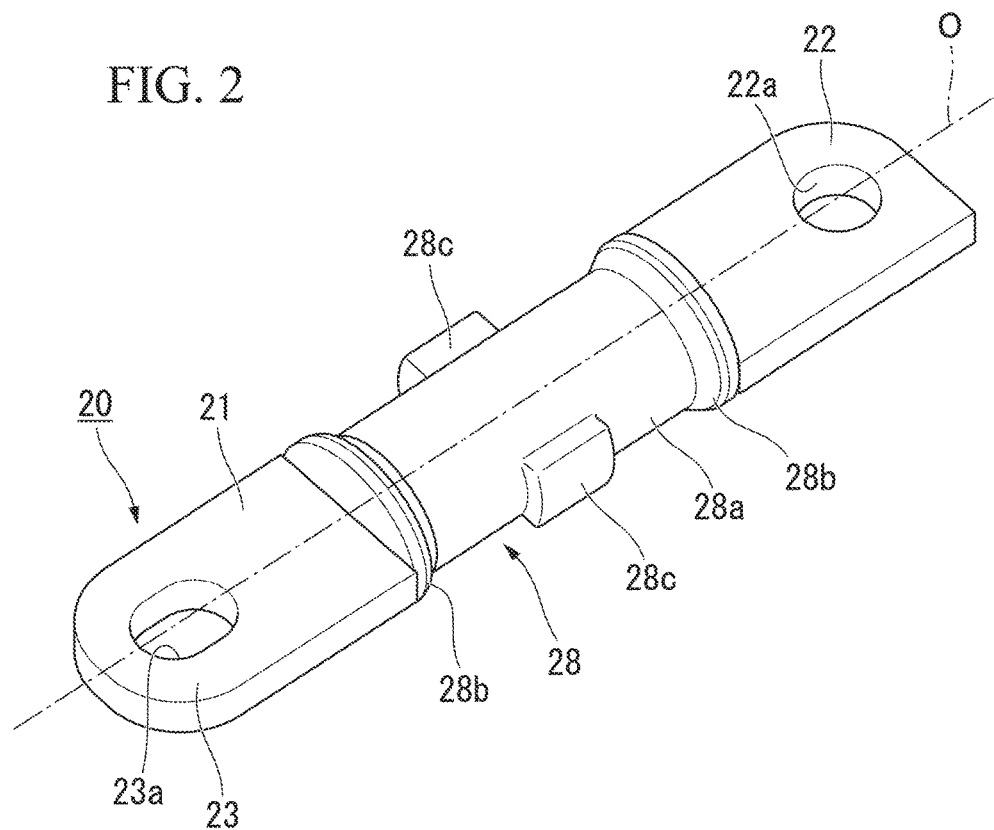
FIG. 2 is a perspective view of an inner attachment member.

As shown in FIG. 2, the interior member 28 is formed in a cylindrical shape covering the entire region of the rigid member 21 in the circumferential direction. The interior member 28 includes a main body portion 28a formed at a portion corresponding to the bottom surface 25a of the recessed portion 25 in the axial direction (see FIG. 1) and a pair of overhanging portions 28b and 28b formed at portions corresponding to the pair of inclined surfaces 25b of the recessed portion 25 in the axial direction (see FIG. 1).

The overhanging portion 28b is formed to have a larger diameter than the main body portion 28a and is overhanging outward in the diameter direction.

A pair of protruding portions 28c and 28c are formed at an intermediate portion of the main body portion 28a in the axial direction. The pair of protruding portions 28c and 28c are formed on both sides of the rigid member 21 in the width direction with the central axis O interposed therebetween, and protrude outward in the diameter direction.

As shown in FIG. 1, the elastic body 30 is formed in a cylindrical shape of, for example, a rubber material, and an inner circumferential surface thereof is fixed to an outer circumferential surface of the main body portion 28a of the interior member 28. The elastic body 30 is, for example, vulcanized and bonded to the outer circumferential surface of the interior member 28. Also, the outer attachment member 10 is buried in the elastic body 30. In this way, the elastic body 30 elastically connects the outer attachment member 10 and the inner attachment member 20.

In the elastic body 30, a plurality of liquid chamber concave portions 32 configured to define a hollow liquid chamber inward in the diameter direction are formed at an interval in the circumferential direction. Two liquid chamber concave portions 32 are formed in the elastic body 30 and are separately disposed at positions corresponding to the protruding portions 28c of the interior member 28 on both sides having the central axis O therebetween in the diameter direction. The two liquid chamber concave portions 32 are of the same shape and size as each other and have a rectangular shape that is elongated in the circumferential direction when viewed from the side of the elastic body 30 and from the outside in the diameter direction.

Also, the elastic body 30 may be press-fitted into the outer attachment member 10. In this case, both end portions of the outer attachment member 10 in the axial direction may be bent inward in the diameter direction to support the elastic body 30 in the axial direction.

A convex portion 33 is formed at a position corresponding to that of the protruding portion 28c of the interior member 28 inside the liquid chamber concave portion 32. The convex portion 33 protrudes outward in the diameter direction.

A communicating groove (not shown) configured to allow inner portions of the two liquid chamber concave portions 32 to communicate is formed in a region between the two liquid chamber concave portions 32 in the outer circumferential surface of the elastic body 30.

A cover member 36 formed of a material that is harder than the material forming the elastic body 30 is separately fitted to each of the liquid chamber concave portions 32. In this way, the liquid chamber concave portion 32 is covered from the outside in the diameter direction, and a liquid chamber is defined.

The cover member 36 is formed of, for example, a synthetic resin material or the like. A communicating opening (not shown) that is open in the diameter direction through the liquid chamber and two connecting grooves 37a and 37b arranged at an interval in the axial direction are formed in the cover member 36.

The two connecting grooves 37a and 37b extend over the entire length of the cover member 36 in the circumferential direction. A single communicating opening is formed on an inner surface of either one of the two connecting grooves 37a and 37b. The communicating groove of the elastic body 30 is connected to either one circumferential end portion of both end portions of one of the two connecting grooves 37a and 37b having the communicating opening formed, and is connected to both circumferential end portions of the other not having the communicating opening formed.

In the above constitution, by the communicating groove of the elastic body 30 and the connecting grooves 37a and 37b of the cover member 36 being covered by the outer cylinder 40 from the outside in the diameter direction, an orifice passage configured to allow adjacent liquid chambers in the circumferential direction to communicate is defined. The orifice passage extends over the entire circumference of the elastic body 30 and the cover member 36, and is a single passage configured to connect a communicating opening formed in one cover member 36 and a communicating opening formed in the other cover member 36.

Also, when a vibration is input to the vibration damping device 1, the elastic body 30 is elastically deformed, an internal volume of each liquid chamber is changed, and a liquid in the liquid chamber flows through the orifice passage and generates liquid-column resonance, so that the vibration is attenuated and absorbed.

According to the vibration damping device 1 according to the present embodiment, because the rigid member 21 is formed in a plate shape, a cylindrical body or a rod body, for example, is not required to be crushed and deformed in the diameter direction, and the rigid member 21 can be easily formed. Thus, by inserting the fastening member such as a bolt into the mounting holes 22a and 23a that open in the diameter direction, the vibration damping device 1, in which the protruding portions 22 and 23 are connected to the vehicle body which serves as the vibration receiving part, can be manufactured at low cost. Consequently, a vibration damping device 1 which can be easily manufactured at low cost can be provided.

Also, because the interior member 28 covers the rigid member 21 over the entire region in the circumferential direction, the interior member 28 can be firmly fixed to the rigid member 21.

Also, in the rigid member 21, because the concave portion 26 penetrating in the diameter direction is formed in the portion located in the outer attachment member 10, the synthetic resin material is introduced into the concave portion 26, and the interior member 28 is fixed, the interior member 28 can be firmly and reliably fixed to the rigid member 21.

Also, because the mounting holes 22a, 23a and the concave portion 26 are formed on a surface of the rigid member 21 and pass through the front and rear surfaces of the rigid member 21, the rigid member 21 can be easily manufactured by, for example, pressing.

Also, because the recessed portion 25 formed to narrow the width of the rigid member 21 is provided, the weight of the rigid member 21 can be reduced. In addition, because the interior member 28 is fixed to the inside of the recessed portion 25, by the interior member 28 being introduced into the recessed portion 25, movement of the interior member 28 along the axial direction can be prevented and the interior member 28 can be firmly fixed to the rigid member.

Also, because the interior member 28 is formed of a synthetic resin material, insert molding using the rigid member 21 as an insert item can be performed, and the vibration damping device 1 can be reliably formed at low cost.

Furthermore, because the interior member 28 is formed of a synthetic resin material, when forming the protruding portion 28c in the interior member 28 protruding in the diameter direction, the protruding portion 28c can be formed by injection molding without, for example, welding or attaching another member. Thus, an increase in the manufacturing cost can be reliably minimized.

The technical scope of the present invention is not limited to the above embodiment, and various modifications can be made without departing from the gist of the present invention.

In the above-described embodiment, the outer attachment member 10 is connected to the trailing arm of the torsion beam type rear suspension which is the vibration generating part, and the inner attachment member 20 is connected to the vehicle body which is the vibration receiving part. However, the inner attachment member 20 may be connected to the trailing arm of the torsion beam type rear suspension which is the vibration generating part, and the outer attachment member 10 may be connected to the vehicle body which is the vibration receiving part.

Further, members to which the outer attachment member 10 and the inner attachment member 20 are connected are not limited to those in the above-described embodiment. That is, the application of the vibration damping device 1 according to the embodiment is not limited to a connecting portion between a trailing arm of a torsion beam type rear suspension (the vibration generating part) and a vehicle body (the vibration receiving part). Therefore, the vibration damping device 1 according to the embodiment can also be applied to, for example, an engine mount of a vehicle, a mount of a generator mounted on a construction machine, a mount of a machine installed in a factory, and the like.

In the above-described embodiment, the vibration damping device 1 has each of the liquid chambers and the orifice passage. However, the vibration damping device 1 may not have each of the liquid chambers and the orifice passage.

In the above-described embodiment, both end portions of the rigid member 21 protrude outward in the axial direction from both end portions of the outer attachment member 10, respectively, so that the pair of protruding portions 22 and 23 are provided. However, only one end portion of the rigid member 21 may protrude outward in the axial direction from one end portion of the outer attachment member 10, so that a single protruding portion is provided.

In the above-described embodiment, the through-hole passing through the front and rear surfaces of the rigid member 21 is formed as the concave portion 26 that is concave in the diameter direction, in a portion of the rigid member 21 located in the outer attachment member 10. However, the concave portion 26 may not pass through the front and rear surfaces of the rigid member 21.

Moreover, elements in the above-described embodiment may be appropriately replaced with well-known elements within the scope not departing from the gist of the present invention, and the above-described modified examples may be appropriately combined.

A vibration damping device 101 according to a second embodiment of the present invention may be disposed, for example, in a connecting portion between a trailing arm of a trailing arm type rear suspension (a vibration generating part) and a vehicle body (a vibration receiving part), and prevent a vibration or an impact from being transmitted from the vibration generating part to the vibration receiving part.

Figure 3:
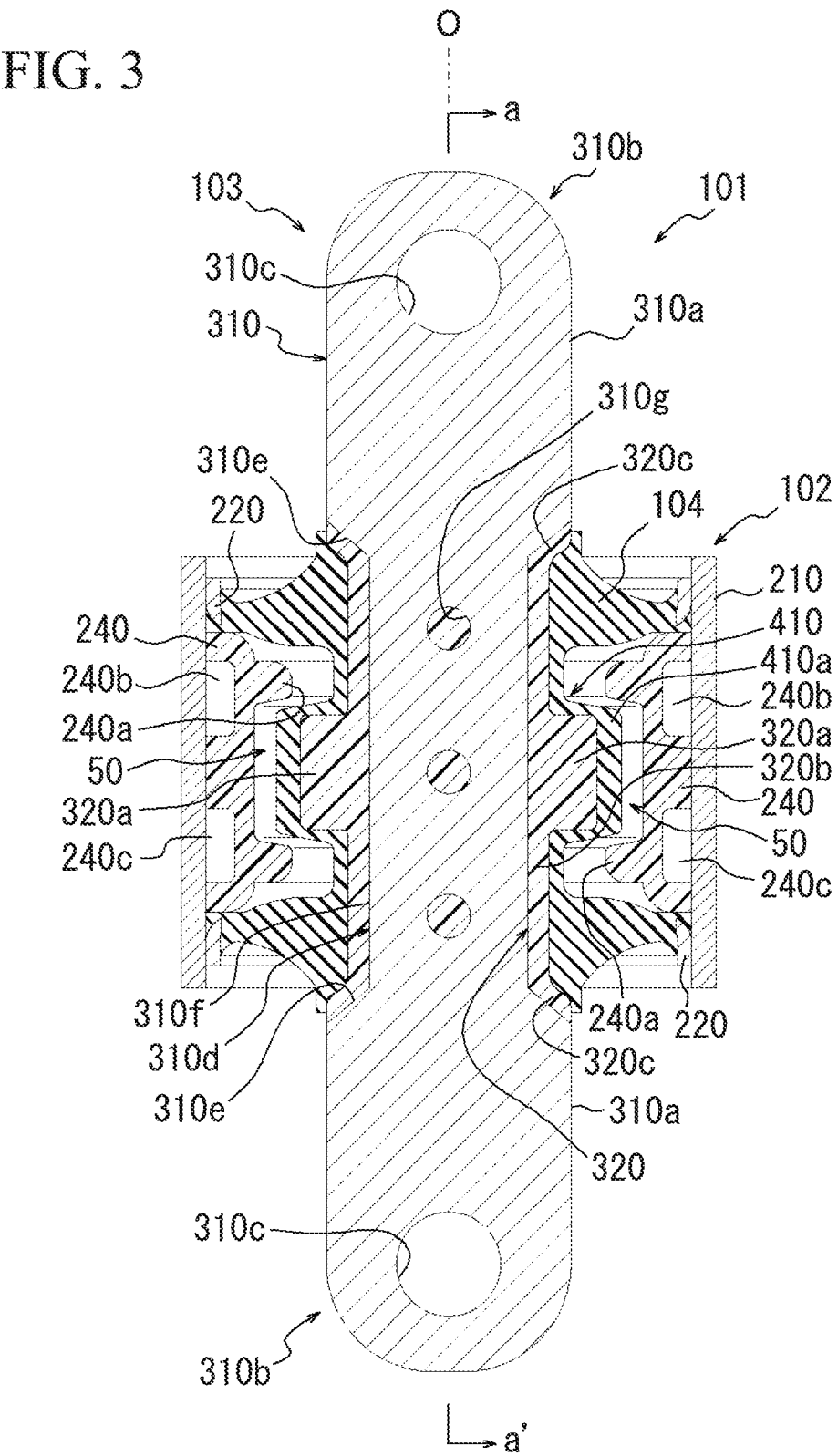
FIG. 3 is a longitudinal cross-sectional view showing a vibration damping device according to a second embodiment of the present invention.
Figure 4:
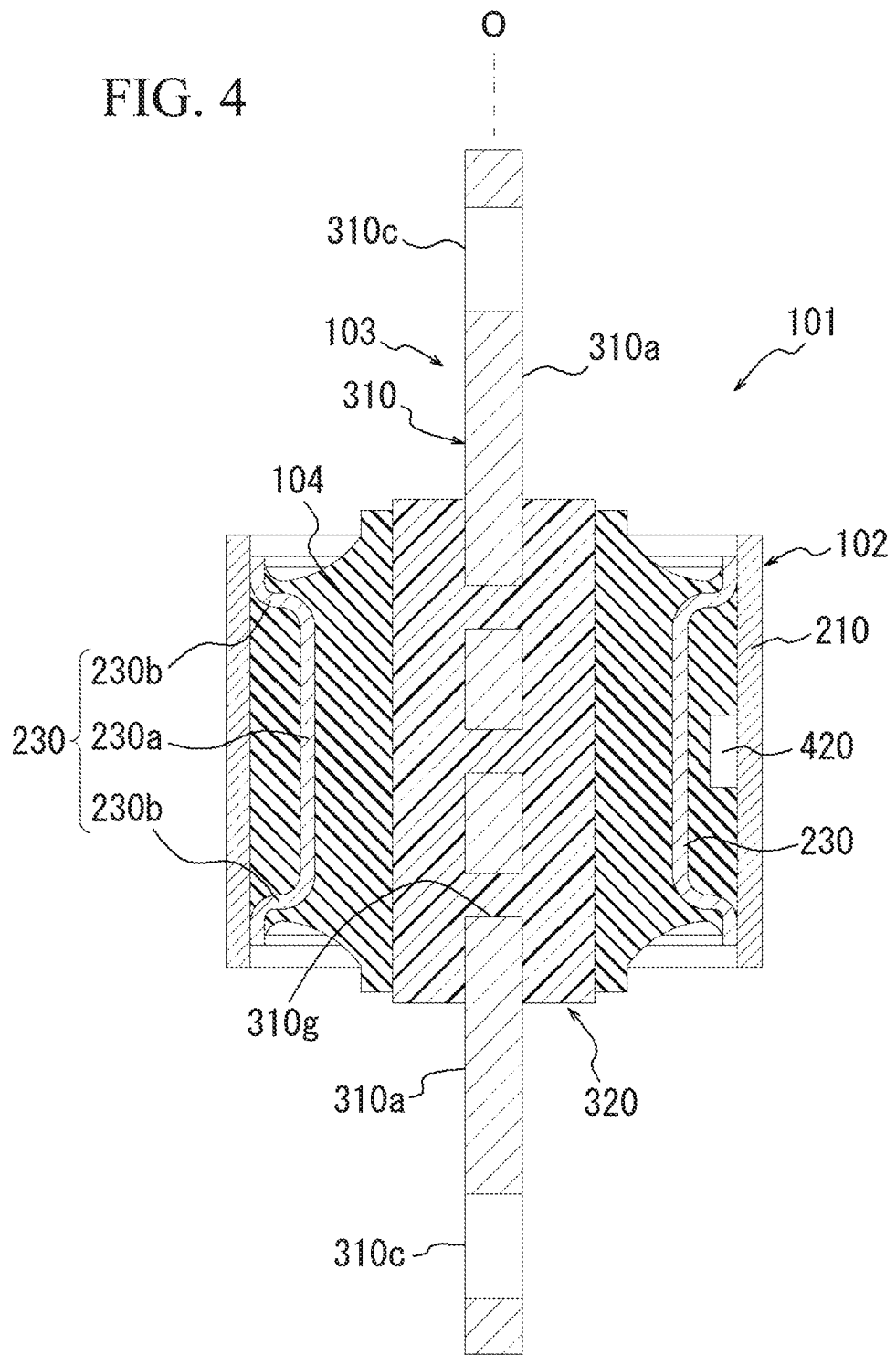
FIG. 4 is a longitudinal cross-sectional view taken along line a-a' of the vibration damping device shown in FIG. 3.

As shown in FIGS. 3 and 4, the vibration damping device 101 includes an outer attachment member 102 connected to either one of the vibration generating part and the vibration receiving part, an inner attachment member 103 connected to the other, and an elastic body 104 configured to connect the outer attachment member 102 and the inner attachment member 103.

In the shown example, the outer attachment member 102, the inner attachment member 103, and the elastic body 104 are arranged to be coaxial with a common axis. Hereinafter, the common axis is referred to as a central axis O, a direction along the central axis O is referred to as an axial direction, a direction orthogonal to the central axis O is referred to as a diameter direction, and a direction of rotation around the central axis O is referred to as a circumferential direction.

The outer attachment member 102 includes a cylindrical outer cylinder 210 forming an outer surface of the outer attachment member 102 (an outer surface of the vibration damping device 101). The outer cylinder 210 is formed in a cylindrical shape of, for example, a metal material, and the outer cylinder 210 is fixed by being connected to, for example, a trailing arm (not shown) which serves as the vibration generating part.

The outer attachment member 102 includes a pair of ring parts 220 respectively located at end portions in the axial direction inside the outer cylinder 210 in the diameter direction and extending over the entire circumference of the end portions, and a connecting part 230 shown in FIG. 4 which is configured to connect the pair of ring parts 220 in a convex shape toward an inside in the diameter direction. Also, in the shown example, the connecting part 230 includes an intermediate portion 230a extending along the axial direction and a side portion 230b configured to connect the intermediate portion 230a and the ring parts 220 on both sides, and a pair of connecting parts 230 are symmetrically provided with respect to the central axis O. Also, the pair of ring parts 220 in the axial direction and the pair of connecting parts 230 in the diameter direction are integrally formed.

Further, the outer attachment member 102 includes an orifice part 240 disposed at a position in the circumferential direction at which the pair of connecting parts 230 are not disposed and between the pair of ring parts 220 in the axial direction inside the outer cylinder 210 in the diameter direction. In the embodiment, the outer attachment member 102 includes a pair of orifice parts 240 symmetrically provided with respect to the central axis O, and, as shown in FIG. 3, the orifice part 240 is fitted into a liquid chamber concave portion 410 of the elastic body 104 forming a liquid chamber 50 that will be described below.

Therefore, the outer attachment member 102 includes the outer cylinder 210, the ring parts 220, the connecting parts 230, and the orifice parts 240, and the outer cylinder 210, the ring parts 220, the connecting parts 230, and the orifice parts 240 are formed in a cylindrical shape as a whole.

The orifice part 240 may be formed of a material, e.g., a synthetic resin material or a metal such as aluminum, that is harder than the material forming the elastic body 104. A communicating opening (not shown) that is open in the diameter direction through the liquid chamber 50 and two connecting grooves 240b and 240c arranged at an interval in the axial direction are formed in the orifice part 240. The two connecting grooves 240b and 240c extend over the entire length of the orifice part 240 in the circumferential direction. A single communicating opening is formed in a groove wall that partitions either one of the two connecting grooves 240b and 240c. As shown in FIG. 4, in the elastic body 104, a single communicating groove 420 configured to allow inner portions of two liquid chambers 50 to communicate is formed in a region between the liquid chambers 50 in the circumferential direction. The communicating groove 420 of the elastic body 104 is connected to either one of both circumferential end portions of one of the two connecting grooves 240b and 240c having the communicating opening formed, and is connected to both circumferential end portions of the other connecting groove not having the communicating opening formed.

The inner attachment member 103 includes a rigid member 310 disposed in the outer attachment member 102 and an interior member 320 located in the outer attachment member 102 in the axial direction and formed of an injection molding material (mostly a synthetic resin material, an aluminum material, or the like) fixed to the rigid member 310.

The rigid member 310 may be formed of, for example, a metal material. In this embodiment, the rigid member 310 has a predetermined width (a width of the longitudinal cross-section of FIG. 3 in the diameter direction) and has a rectangular parallelepiped shape (a plate shape) extending along the axial direction. Also, in this embodiment, the width of the rigid member 310 is narrower than an inner diameter of the outer attachment member 102, and the length of the rigid member 310 measured along the axial direction is longer than the length of the outer attachment member 102 measured along the axial direction.

Further, in this embodiment, both end portions of the rigid member 310 in the axial direction are protruding portions 310a respectively protruding outward in the axial direction from both end portions of the outer attachment member 102 in the axial direction while the rigid member 310 is arranged in the outer attachment member 102. Also, the rigid member 310 is arranged in the outer attachment member 102 so that the lengths of the protruding portions 310a on both sides of the rigid member 310 are equal.

The rigid member 310 including the protruding portion 310a may have any shape, and have a cylindrical shape partially or as a whole.

In this embodiment, corner portions 310b of both end portions of the rigid member 310 in the axial direction (corner portions of the protruding portion 310a) are chamfered, and the corner portions 310b have an arc shape in a plan view. A mounting hole 310c that is open in a thickness direction of the rigid member 310, i.e., passes through front and rear surfaces of the rigid member 310, to connect the rigid member 310 to a vibration generating part or a vibration receiving part may be formed in each of the protruding portions 310a. More specifically, the mounting hole 310c may have a circular shape having a center on the center of the rigid member 310 (the protruding portion 310a) in the width direction (on the central axis O in this example), may have a fastening member (not shown) such as a bolt inserted thereinto, and may connect the rigid member 310 to a vehicle body or the like which is the vibration receiving part. The connection of the rigid member 310 (the protruding portion 310a) to the vibration generating part of the vibration receiving part may be performed using any method. Other than performing the connection by the fastening member such as a bolt, the protruding portion 310a may also be connected to the vibration generating part or the vibration receiving part by welding.

In this embodiment, the rigid member 310 includes a recessed portion 310d formed at least in a portion located in the outer attachment member 102 to narrow the width of the rigid member 310. In the shown example, the rigid member 310 includes a pair of recessed portions 310d symmetrically provided with respect to the central axis O. Specifically, although the recessed portion 310d is not particularly limited, in the shown example, a length thereof from the center in the width direction to a side surface of the rigid member 310 is smaller than a length of the portion other than the recessed portion 310d. More specifically, the recessed portion 310d includes an inclined portion 310e having a length from the center in the width direction to the side surface of the rigid member 310 gradually decreasing from one side toward the other side in the axial direction, a bottom portion 310f having a constant length following the inclined portion 310e, and an inclined portion 310e having a gradually increasing length following the bottom portion 310f. The bottom portion 310f is formed in a portion of the rigid member 310 located in the outer attachment member 102.

In this embodiment, a plurality of concave portions 310g which are concave in the diameter direction is formed in the portion of the rigid member 310 located in the outer attachment member 102, between the pair of recessed portions 310d in the shown example. The concave portion 310 g is formed in a circular shape having a center on a surface of the rigid member 310, specifically, on the center in the width direction (on the central axis O in this example). In the shown example, three concave portions 310g are formed at equal intervals in the extending direction of the rigid member 310, and each of the concave portions 310g opens in the thickness direction of the rigid member 310, i.e., passes through the front and rear surfaces of the rigid member 310.

As shown in FIGS. 3 and 4, the interior member 320 is located in the outer attachment member 102 and is fixed to the rigid member 310. In this embodiment, the interior member 320 is fixed to the recessed portion 310d of the rigid member 310 and protrudes slightly outward from the outer attachment member 102 in the axial direction.

The interior member 320 may be fixed to the rigid member 310 by, for example, insert molding using the rigid member 310 as an insert item in a state in which an injection molding material (mostly, a synthetic resin material, an aluminum material, or the like) is introduced into the concave portion 310g of the rigid member 310 in the shown example.

Figure 5:
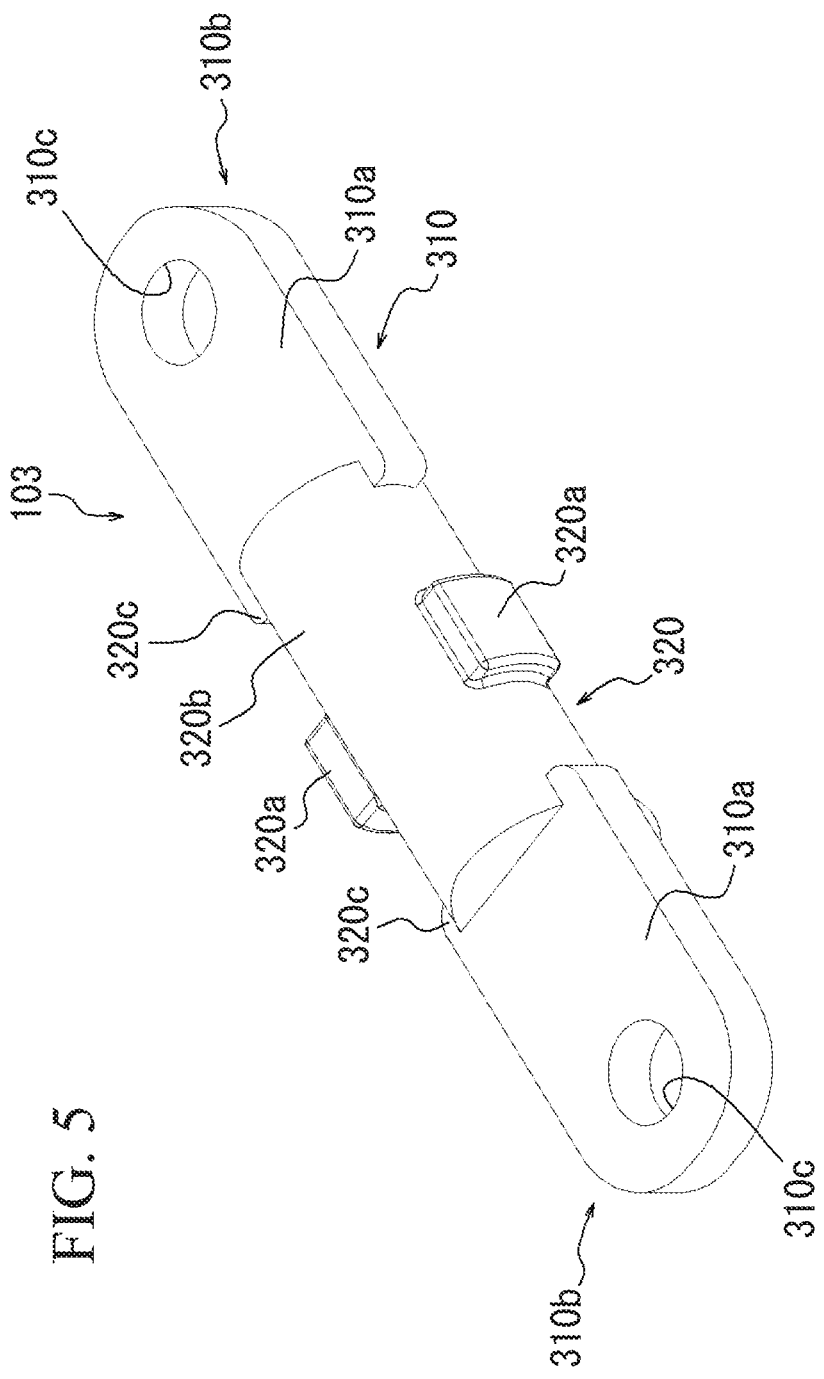
FIG. 5 is a perspective view showing an inner attachment member of the vibration damping device shown in FIG. 3.

As shown in FIG. 5, the interior member 320 covers the rigid member 310 over its entire circumference and is formed in a substantially cylindrical shape (a substantially cylindrical shape on both sides when the interior member 320 is fixed to the rigid member 310). The interior member 320 includes a first protruding portion 320a that will be described below, a main body portion 320b formed in a portion corresponding to the bottom portion 310f of the recessed portion 310d in the axial direction and having the first protruding portion 320a arranged therein, and a pair of overhanging portions 320c formed in portions corresponding to the pair of inclined portions 310e of the recessed portion 310d in the axial direction.

The first protruding portion 320a protrudes outward in the diameter direction. In this embodiment, as shown in FIG. 3, a pair of first protruding portions 320a are formed at a center of the interior member 320 in the axial direction in a portion of the vibration damping device 101 in the circumferential direction in which the liquid chamber 50 is formed between the outer attachment member 102 and the inner attachment member 103 with the central axis O interposed therebetween. Further, in this embodiment, the first protruding portion 320a is formed to protrude outward in the width direction from both sides of the rigid member 310 in the width direction. Specifically, the first protruding portion 320a is formed to protrude outward in the width direction from a surface of the interior member 320 corresponding to a position in the axial direction of a second protruding portion 240a that will be described below. Further, in this embodiment, the first protruding portion 320a is disposed in a state of being fitted into the elastic body 104 that will be described below, specifically, in a state of being embedded therein.

In this embodiment, as shown in FIGS. 3 to 5, an outer circumferential surface of the main body portion 320b is formed in a circular shape in a cross-section in the direction orthogonal to the axial direction, and a width of the overhanging portion 320c is substantially equal to the width of the rigid member 310 and is formed to be wider than that of the main body portion 320b in the longitudinal cross-sectional view shown in FIG. 3.

As shown in FIG. 3, an inner circumferential surface of the elastic body 104 is fixed to the outer circumferential surface of the interior member 320 by, for example, being vulcanized and bonded thereto using, for example, a rubber material. The ring part 220 and the connecting part 230 of the outer attachment member 102 are fixed to the elastic body 104 by, for example, being vulcanized and bonded thereto, and the elastic body 104 in which the ring part 220 and the connecting part 230 are buried is arranged inside the outer cylinder 210 of the outer attachment member 102 together with the inner attachment member 103 while the orifice part 240 is mounted in the elastic body 104, thereby, for example, vulcanizing and bonding the outer attachment member 102 and the inner attachment member 103 to each other. In this way, the elastic body 104 elastically connects the outer attachment member 102 and the inner attachment member 103, and the outer cylinder 210 surrounds the orifice part 240 and the elastic body 104 and liquid-tightly covers the outer circumferential surfaces thereof.

The elastic body 104 may be press-fitted into the outer cylinder 210. In this case, both end portions of the outer cylinder 210 in the axial direction may be bent inward in the diameter direction to support the elastic body 104 in the axial direction.

As shown in FIG. 3, the liquid chamber concave portion 410 that is concave in a shape recessed outward in the diameter direction and defines the liquid chamber 50 is formed in the elastic body 104. In this embodiment, a plurality of liquid chamber concave portions 410 are formed at an interval in the circumferential direction. Specifically, two liquid chamber concave portions 410 are formed in the elastic body 104, are separately disposed at positions corresponding to those of the first protruding portions 320a of the interior member 320 on both sides having the central axis O therebetween in the diameter direction, and are of the same shape and size as each other. As shown in FIG. 3, a convex portion 410a protruding outward in the diameter direction by the first protruding portion 320a being fitted into the elastic body 104 is formed at a position corresponding to that of the first protruding portion 320a at the center of the interior member 320 in the axial direction in the liquid chamber concave portion 410. Due to the convex portion 410a, the liquid chamber concave portion 410 has a substantially M-shape in the longitudinal cross-sectional view shown in FIG. 3. Also, by the first protruding portion 320a being covered by the convex portion 410a of the elastic body 104, the first protruding portion 320a and the orifice part 240 can be prevented from coming into direct contact and generating contact noise.

Also, when a plurality of liquid chambers 50 are formed as in this embodiment, as shown in FIG. 4, a single communicating groove 420 configured to allow the liquid chambers 50 defined by the liquid chamber concave portions 410 to communicate may be formed in a region of the elastic body 104 between the liquid chambers 50 in the circumferential direction at an outer circumferential surface of the elastic body 104 in the shown example.

In the above constitution, an orifice passage configured to allow the liquid chambers 50 adjacent in the circumferential direction to communicate is defined by the communicating groove 420 of the elastic body 104 and the connecting grooves 240b and 240c of the orifice part 240 being covered by the outer cylinder 210 from outside in the diameter direction. The orifice passage is a single passage that connects a communicating opening formed in one orifice part 240 and a communicating opening formed in the other orifice part 240.

Also, when a vibration is input to the vibration damping device 101, the elastic body 104 is elastically deformed, an internal volume of each liquid chamber 50 is changed, and a liquid in the liquid chamber 50 flows through the orifice passage and generates liquid-column resonance, so that the vibration is attenuated and absorbed.

In this embodiment, the communicating groove 420 is formed in the elastic body 104 as a part of the orifice passage for allowing the liquid chambers 50 to communicate with each other. However, the orifice passage can also be formed by connecting the orifice parts 240 respectively defining the liquid chambers 50 to each other and using only the integrated orifice part 240.

As shown in FIG. 3, the second protruding portion 240a protruding inward in the diameter direction is formed in the outer attachment member 102. In this embodiment, the second protruding portion 240a is formed in the orifice part 240 of the outer attachment member 102. In the shown example, the second protruding portion 240a is formed in each of the pair of orifice parts 240.

Also, in this embodiment, the second protruding portion 240a is formed to extend in the circumferential direction. Positions of the second protruding portions 240a in the circumferential direction and the positions of the first protruding portions 320a of the interior member 320 in the circumferential direction correspond to each other. That is, the second protruding portion 240a and the first protruding portion 320a overlap each other in the circumferential direction. Here, the positions in the circumferential direction "corresponding to each other" does not mean that lengths of the protruding portions in the circumferential direction correspond to each other and the protruding portions are located at the exact same position, but means that only at least a portion of a protruding portion necessarily corresponds to the other protruding portion in the circumferential direction and the protruding portions are arranged to at least partially overlap each other in the circumferential direction. However, it is preferable that the position of either one of the first protruding portion 320a and the second protruding portion 240a completely corresponds to or includes the position of the other in the circumferential direction.

Further, as shown in FIG. 3, with respect to the first protruding portion 320a, the second protruding portions 240a are arranged at positions different from each other in the axial direction. In this embodiment, in each of the pair of orifice parts 240 in the diameter direction, two second protruding portions 240a are formed by being spaced apart from each other in the axial direction at an interval in the axial direction. Two second protruding portions 240a located at the same side in the circumferential direction are arranged outward in the axial direction with respect to the first protruding portion 320a. Therefore, the first protruding portion 320a is disposed between the two second protruding portions 240a. Here, the positions in the axial direction being different from each other means that an apex of the first protruding portion 320a and an apex of the second protruding portion 240a are not aligned at least in the axial direction.

In this embodiment, as shown in FIG. 3, with respect to the first protruding portion 320a, the second protruding portion 240a, and the convex portion 410a of the elastic body 104, the second protruding portion 240a and the convex portion 410a of the elastic body 104 overlap in the axial direction, and the first protruding portion 320a and the second protruding portion 240a do not overlap in the axial direction, i.e., the first protruding portion 320a and the second protruding portion 240a do not face each other in the axial direction. However, the first protruding portion 320a, the second protruding portion 240a, and the convex portion 410a of the elastic body 104 can overlap in the axial direction in any manner. The second protruding portion 240a and the convex portion 410a of the elastic body 104 may not overlap in the axial direction, and the first protruding portion 320a and the second protruding portion 240a may overlap in the axial direction. By changing the overlapping manner, a spring ratio of the vibration damping device can be adjusted.

Also, in this embodiment, as shown in FIG. 3, the first protruding portion 320a and the second protruding portion 240a are each provided at two positions in the circumferential direction. However, the first protruding portion 320a and the second protruding portion 240a may also be provided at only a portion in the circumferential direction, i.e., at only one position in the circumferential direction.

Hereinafter, an action and an advantageous effect of the vibration damping device according to the second embodiment of the present invention will be described.

When the vibration damping device 101 having the above constitution is used for automobiles, for example, the outer attachment member 102 is connected to one of a trailing arm of a trailing arm type rear suspension which serves as a vibration generating part and a vehicle body which serves as a vibration receiving part, and the inner attachment member 103 is connected to the other.

Then, with respect to the vibration damping device 101, for example, when a vibration is applied in an input direction of a main vibration, e.g., the diameter direction in the second embodiment, and the axial direction orthogonal thereto, and the inner attachment member 103 and the outer attachment member 102 are relatively displaced in the axial direction, because the first protruding portion 320a is formed in the inner attachment member 103 and the second protruding portion 240a is formed in the outer attachment member 102, the displacements in the axial direction can be easily suppressed by the first protruding portion 320a and the second protruding portion 240a. Therefore, a relatively large spring force in the axial direction can be obtained. As a result, a spring ratio between the input direction of the main vibration and a direction different therefrom can be controlled.

Further, in this embodiment, the inner attachment member 103 includes the interior member 320 located in the outer attachment member 102 and formed of an injection molding material (mostly a synthetic resin material, an aluminum material, or the like) fixed to the rigid member 310, and the inner attachment member 103 can be easily formed so that the vibration damping device 101 can sufficiently exhibit desired performance (features such as a spring ratio, durability). Therefore, the vibration damping device 101 capable of controlling a spring ratio can be easily manufactured. More specifically, although enabling the vibration damping device 101 to exhibit desired performance tends to be difficult or costly when the interior member 320 is not provided at the rigid member 310 in the case in which the rigid member 310 of the inner attachment member 103 is formed in a desired shape such as a shape that is easily connected to the vibration generating part or the vibration receiving part, by disposing the interior member 320 at the rigid member 310, the shape of the interior member 320 including the first protruding portion 320a may be easily formed so that the vibration damping device 101 can sufficiently exhibit desired performance. Therefore, the vibration damping device 101 capable of controlling a spring ratio can be easily manufactured.

Therefore, according to the vibration damping device 101 of the present embodiment, the vibration damping device 101 that is capable of controlling a spring ratio between an input direction of a main vibration and a direction different therefrom and can be manufactured by a simple method can be provided.

Here, in the vibration damping device 101 according to this embodiment, because the first protruding portion 320a and the second protruding portion 240a are disposed in each of a pair of liquid chambers 50 adjacent in the circumferential direction, the inner attachment member 103 and the outer attachment member 102 are easily displaced in a straight line without being relatively biased in the axial direction. Therefore, a vibration in the axial direction can be effectively attenuated and absorbed.

Further, in this embodiment, one pair of liquid chambers 50 are arranged. However, there may be only one liquid chamber 50, or the liquid chamber 50 may not be provided.

Also, by forming the rigid member 310 in a plate shape in the vibration damping device 101 according to this embodiment, a vibration damping device which can be easily manufactured at low cost can be provided.

Specifically, for example, when the inner attachment member 103 in which a portion protruding from the vibration damping device 101 (the protruding portion 310a) having a flat shape (flat plate shape) to be connected to the vibration generating part or the vibration receiving part is used as the inner attachment member 103 of the vibration damping device 101, a method of flattening the protruding portion 310a of the inner attachment member 103 includes crushing a cylindrical body or a rod body in the diameter direction and flattening the cylindrical body or the rod body, or fitting a separate member having a flat portion into a cylindrical body. However, such methods have a problem in that it is difficult or costly to manufacture the inner attachment member 103. On the other hand, in this embodiment, a cylindrical body or a rod body, for example, is not required to be crushed and deformed in the diameter direction because the rigid member 310 is formed in a plate shape, and the inner attachment member 103 can be easily formed because the inner attachment member 103 includes the rigid member 310 and the interior member 320. In this way, the vibration damping device 101 can be more simply manufactured at low cost.

Further, in this embodiment, because the mounting hole 310c that is open in the diameter direction orthogonal to the axial direction and into which a fastening member configured to connect the protruding portion 310a to the other of the vibration generating part and the vibration receiving part is fitted is disposed in the protruding portion 310a of the rigid member 310 protruding outward from the outer attachment member 102 in the axial direction along the central axis O, the inner attachment member 103 can be easily connected to the vibration generating part or the vibration receiving part by fitting a fastening member such as a bolt into the mounting hole 310c open in the diameter direction. Also, in this embodiment, because the mounting hole 310c is formed on a surface of the rigid member 310, the mounting hole 310c can be easily formed by, for example, pressing.

Further, in this embodiment, because the interior member 320 covers the rigid member 310 over its entire circumference, the interior member 320 can be firmly fixed to the rigid member 310.

Furthermore, in this embodiment, because the concave portion 310g is formed in a portion of the rigid member 310 located in the outer attachment member 102, and the interior member 320 is fixed to the rigid member 310 by an injection molding material (a synthetic resin material, an aluminum material or the like) introduced into the concave portion 310g, the interior member can firmly and securely be fixed to the rigid member 310.

Also, because the concave portion 310g is formed on the surface of the rigid member 310, the concave portion 310g of the rigid member 310 can be easily formed by, for example, press working.

Further, in this embodiment, because the rigid member 310 includes the recessed portion 310d formed to narrow the width of the rigid member 310, the weight of the rigid member 310 can be reduced. Also, because the interior member 320 is fixed inside the recessed portion 310d, by the interior member 320 being introduced into the recessed portion 310d, movement of the interior member 320 along the axial direction can be prevented and the interior member 320 can be more firmly fixed to the rigid member 310.

The first protruding portion 320a and the second protruding portion 240a do not face each other in the axial direction in FIG. 3. However, by making the first protruding portion 320a and the second protruding portion 240a face each other in the axial direction, when the inner attachment member 103 and the outer attachment member 102 are displaced relative to each other in the axial direction, a stress due to displacement of one of the first protruding portion 320a and the second protruding portion 240a is influenced by receiving a sufficient reaction force from the other of the first protruding portion 320a and the second protruding portion 240a as well as a reaction force from the elastic body 104 via the elastic body 104. In this way, a spring constant in the axial direction along the central axis O of the inner attachment member 103 can be further increased.

Further, in this embodiment, either one of the first protruding portion 320a and the second protruding portion 240a is formed such that two first protruding portions 320a or two second protruding portions 240a are formed at an interval in the axial direction, and the other is disposed therebetween. Thus, when the inner attachment member 103 and the outer attachment member 102 are displaced relative to each other in the axial direction, a spring constant on both sides in the axial direction along the central axis O of the inner attachment member 103 can be further increased.

From a viewpoint of facilitating an adjustment of a spring ratio in the axial direction, it is preferable that a length measured along the diameter direction from an outer end (apex) of the first protruding portion 320a in the diameter direction up to an outer end of the interior member 320 in the diameter direction located at a position in the axial direction of an inner end (apex) of the second protruding portion 240a in the diameter direction is one half or more of a length measured along the diameter direction from the inner end (apex) of the second protruding portion 240a in the diameter direction up to the outer end of the interior member 320 in the diameter direction located at the position in the axial direction of the inner end (apex) of the second protruding portion 240a in the diameter direction.

Next, a vibration damping device according to a third embodiment of the present invention will be described with reference to FIGS. 6 and 7. Description of elements which are the same as those described above in the description of the second embodiment will be appropriately omitted.

The vibration damping device 101 according to the third embodiment is different from the vibration damping device 101 according to the second embodiment in the following aspects.

Figure 6:
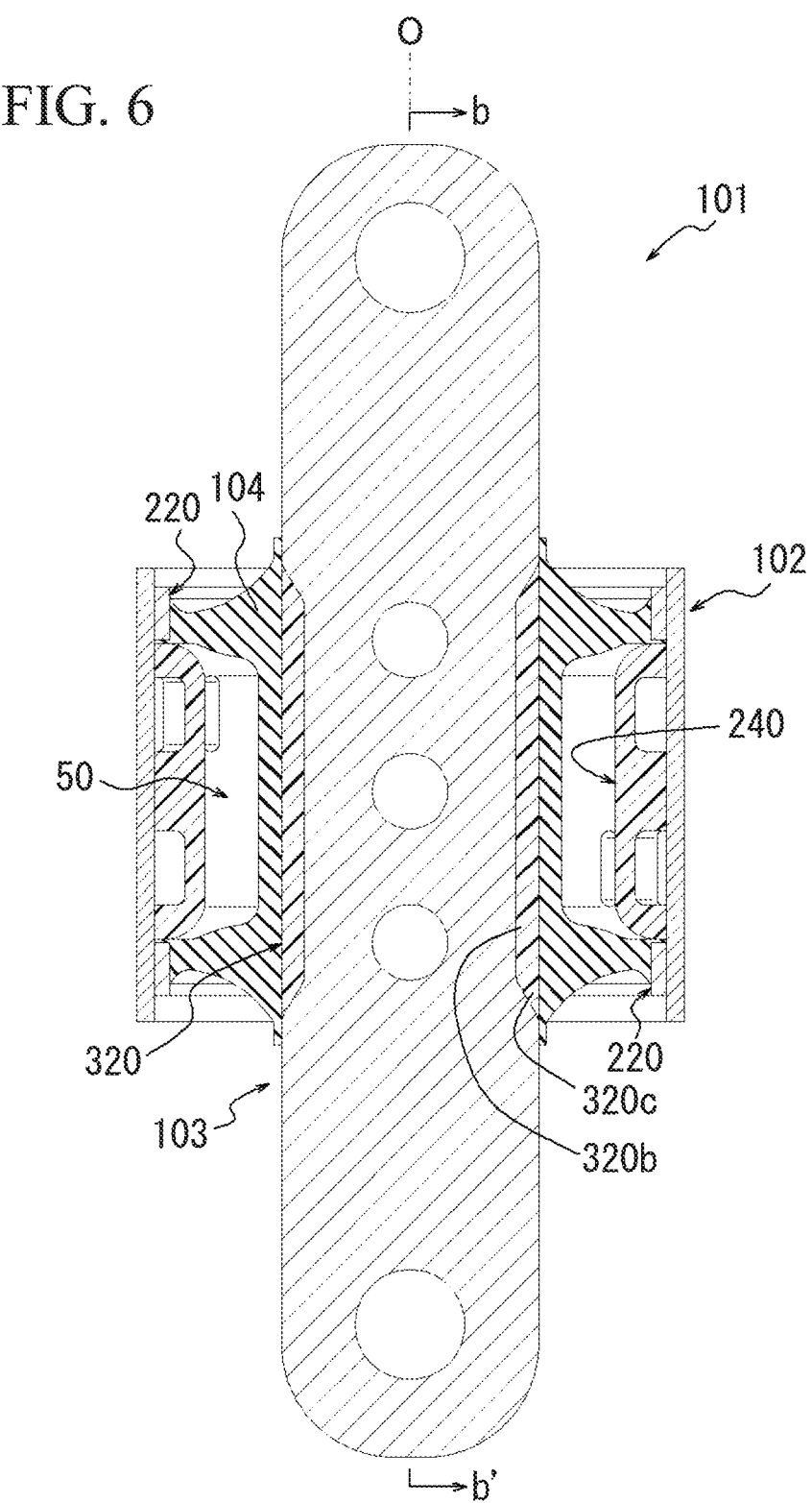
FIG. 6 is a longitudinal cross-sectional view showing a vibration damping device according to a third embodiment of the present invention.
Figure 7:
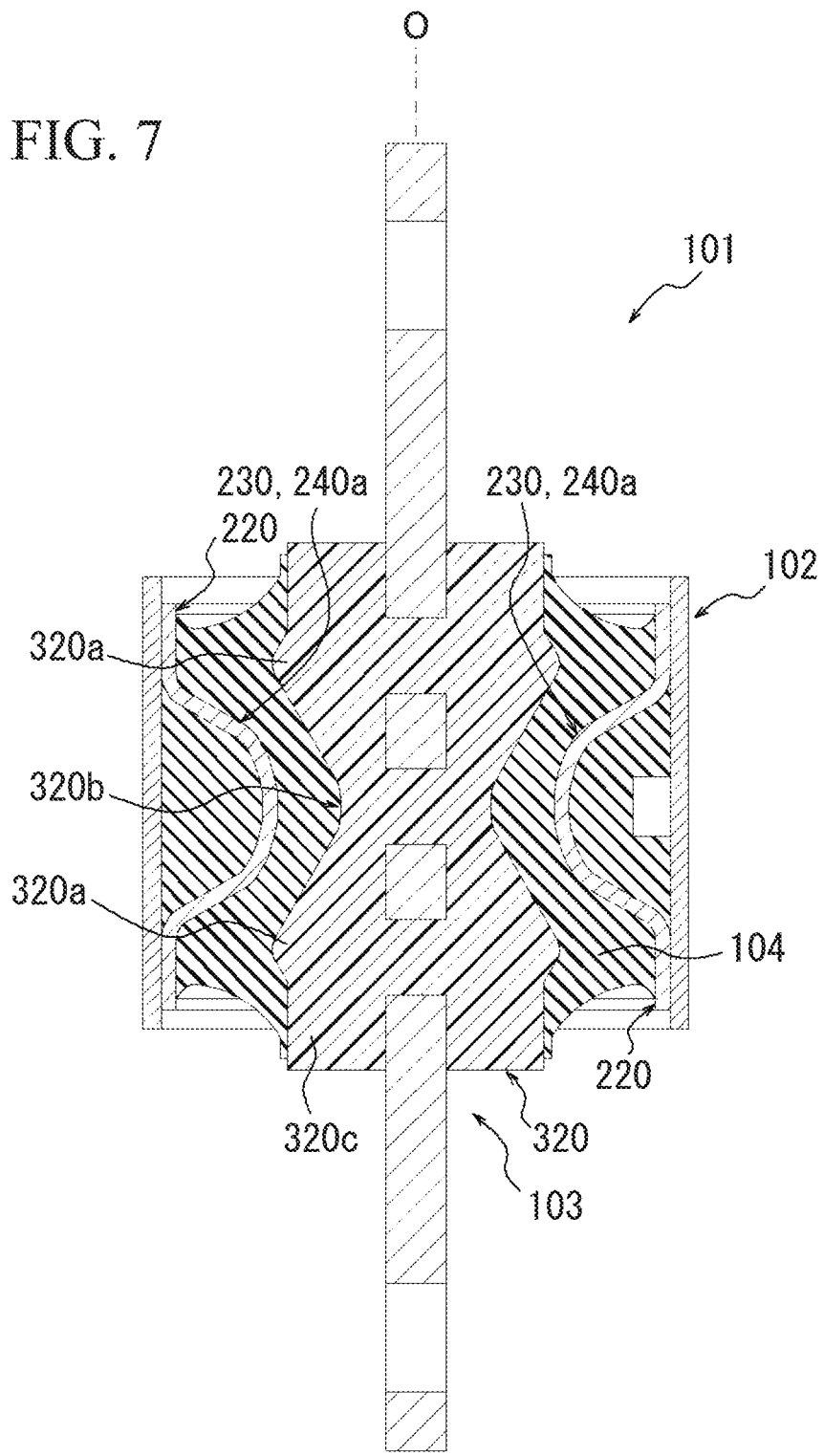
FIG. 7 is a longitudinal cross-sectional view taken along line b-b' of the vibration damping device shown in FIG. 6.

Firstly, in the third embodiment, as shown in FIGS. 6 and 7, the first protruding portion 320a is formed in a portion of the vibration damping device 101 in the circumferential direction on which the liquid chamber 50 is not formed between the outer attachment member 102 and the inner attachment member 103. Also, as shown in FIGS. 6 and 7, in a cross-section in the direction orthogonal to the axial direction, the main body portion 320b and the overhanging portion 320c of the interior member 320 are formed to have an outer diameter of substantially the same width as the width of the rigid member 310.

Further, in the third embodiment, as shown in FIGS. 6 and 7, the second protruding portion is not formed in the orifice part 240, and the second protruding portion 240a is formed in the connecting part 230 of the outer attachment member 102. More specifically, the connecting part 230 is formed as the second protruding portion 240a. In this embodiment, the second protruding portion 240a has a shape in which a length measured along the diameter direction from the central axis O gradually decreases from the ring part 220 to the apex of the second protruding portion 240a.

Further, as shown in FIG. 7, with respect to the second protruding portion 240a, the first protruding portions 320a are disposed at positions different from each other in the axial direction. In this embodiment, one second protruding portion 240a is formed at the center in the axial direction in the connecting part 230. Also, two first protruding portions 320a located on the same side in the circumferential direction are arranged outside in the axial direction with respect to the second protruding portion 240a. Therefore, the second protruding portion 240a is disposed between the two first protruding portions 320a.

In this embodiment, as shown in FIG. 7, the liquid chamber 50 is not present between the first protruding portion 320a and the second protruding portion 240a, and the elastic body 104 is present therebetween. Further, in this embodiment, with respect to the first protruding portion 320a and the second protruding portion 240a, the first protruding portion 320a and the second protruding portion 240a overlap in the axial direction. However, the first protruding portion 320a and the second protruding portion 240a may overlap in the axial direction in any manner. By changing the overlapping manner, a spring ratio of the vibration damping device can be adjusted, or durability can be adjusted because a thickness of the elastic body 104 varies with a degree of overlap.

As described above, in the third embodiment, as shown in FIGS. 6 and 7, the second protruding portion is not formed in the orifice part 240, and the second protruding portion 240a is formed in the connecting part 230 of the outer attachment member 102. Thus, regardless of whether the orifice part 240 is present, the displacement of the inner attachment member 103 and the outer attachment member 102 in the axial direction can be suppressed by the first protruding portion 320a and the second protruding portion 240a.

Although the embodiments of the present invention have been described above with reference to the drawings, the vibration damping device of the present invention is not limited to the above examples and can be appropriately modified. Specifically, for example, in the above embodiment, although the two connecting grooves are provided in the orifice part defining the liquid chamber, the orifice part may have any structure, and whether the liquid chamber is disposed, and the number and the shape of liquid chambers can be randomly selected (that is, a liquid chamber is not an essential constitution in the present invention, and the present invention may also be applied to a vibration damping device not including a liquid chamber). Further, in the above embodiment, although a single communicating groove is provided in one of two elastic bodies between the liquid chambers to allow inner portions of the liquid chambers to communicate, the communicating groove may also be provided in each of both elastic bodies. Further, in the above embodiment, one or both of the first protruding portion and the second protruding portion may extend over an entire circumference in the circumferential direction.

INDUSTRIAL APPLICABILITY

According to the present invention, a vibration damping device that can be easily manufactured at low cost is provided. Further, according to the present invention, a vibration damping device which can be manufactured by a simple method in which a spring ratio in a direction different from an input direction of a main vibration is controlled can be provided.

REFERENCE SIGNS LIST

1 Vibration damping device
10 Outer attachment member
20 Inner attachment member
21 Rigid member
22, 23 Protruding portion
22a, 23a Mounting hole
25 Recessed portion
26 Concave portion
28 Interior member
30 Elastic body
O Central axis
101 Vibration damping device
102 Outer attachment member
210 Outer cylinder
220 Ring part
230 Connecting part
230a Intermediate portion
230b Side portion
240 Orifice part
240a Second protruding portion
240b, 240c Connecting groove
103 Inner attachment member
310 Rigid member
310a Protruding portion
310b Corner portion
310c Mounting hole
310d Recessed portion
310e Inclined portion
310f Bottom portion
310g Concave portion
320 Interior member
320a First protruding portion
320b Main body portion
320c Overhanging portion
104 Elastic body
410 Liquid chamber concave portion
410a Convex portion
420 Communicating groove
50 Liquid chamber
O Central axis

What is claimed is:

1. A vibration damping device comprising:
an outer attachment member connected to one of a vibration generating part and a vibration receiving part;
an inner attachment member connected to the other; and
an elastic body configured to connect the outer attachment member and the inner attachment member, wherein:
the outer attachment member is formed in a cylindrical shape;
the inner attachment member comprises:
a rigid member disposed in the outer attachment member, and
an interior member located in the outer attachment member in an axial direction along a central axis of the outer attachment member, fixed to the rigid member, and formed of a synthetic resin material;
a first protruding portion protruding outward in a diameter direction orthogonal to the axial direction is formed in the interior member;
a second protruding portion protruding inward in the diameter direction is formed in the outer attachment member;
the first protruding portion and the second protruding portion are disposed such that positions in the circumferential direction around the central axis of the outer attachment member correspond to each other and positions in the axial direction are different from each other; and
one of the first protruding portion and the second protruding portion is formed such that two first protruding portions or two second protruding portions are formed at an interval in the axial direction, and the other is disposed therebetween, wherein the first protruding portion and the second protruding portion do not overlap along the axial direction, the rigid member is formed in a plate shape, the interior member covers the rigid member over an entire circumference of the rigid member, and the interior member includes a pair of third protruding portions that are disposed on both sides of the rigid member with the central axis interposed therebetween, and protrude outward in the diameter direction.

2. The vibration damping device according to claim 1, wherein a concave portion that is concave in the diameter direction is formed in a portion of the rigid member located in the outer attachment member, and the interior member is fixed to the rigid member by the synthetic resin material being introduced into the concave portion.

3. The vibration damping device according to claim 2, wherein the concave portion is formed on a surface of the rigid member.

4. The vibration damping device according to claim 1, wherein:

a recessed portion formed to narrow a width of the rigid member is disposed in at least a portion of the rigid member located in the outer attachment member; and the interior member is fixed inside the recessed portion.

5. The vibration damping device of claim 1, wherein the first protruding portion and the second protruding portion face each other in the axial direction.

6. The vibration damping device of claim 1, wherein a pair of first protruding portions protruding outward in a diameter direction orthogonal to the axial direction are formed in the interior member on opposite sides of the central axis, and a pair of second protruding portions protruding inward in the diameter direction are formed in the outer attachment member on opposite sides of the central axis.

7. A vibration damping device comprising:

an outer attachment member connected to one of a vibration generating part and a vibration receiving part;

an inner attachment member connected to the other;

an elastic body configured to connect the outer attachment member and the inner attachment member; and a chamber disposed between the elastic body and the outer attachment member, wherein:

the outer attachment member is formed in a cylindrical shape;

the inner attachment member comprises:

a rigid member disposed in the outer attachment member, and an interior member located in the outer attachment member in an axial direction along a central axis of the outer attachment member, fixed to the rigid member, and formed of a synthetic resin material;

a first protruding portion protruding outward in a diameter direction orthogonal to the axial direction is formed in the interior member;

a second protruding portion protruding inward in the diameter direction is formed in the outer attachment member;

the first protruding portion and the second protruding portion are disposed such that positions in the circumferential direction around the central axis of the outer attachment member correspond to each other and positions in the axial direction are different from each other;

one of the first protruding portion and the second protruding portion is formed such that two first protruding portions or two second protruding portions are formed at an interval in the axial direction, and the other is disposed therebetween; and the chamber is also disposed between the first protruding portion and the second protruding portion, the rigid member is formed in a plate shape, the interior member covers the rigid member over an entire circumference of the rigid member, and the interior member includes a pair of third protruding portions that are disposed on both sides of the rigid member with the central axis interposed therebetween, and protrude outward in the diameter direction.

* * * * *